(12) United States Patent
Niu et al.

(10) Patent No.: US 12,285,911 B2
(45) Date of Patent: Apr. 29, 2025

(54) 3D PRINTING METHOD FOR AN IMPACT-RESISTANCE GRADIENT COMPLEX PART

(71) Applicant: XI?AN JIAOTONG UNIVERSITY, Xi'an (CN)

(72) Inventors: ChunMing Niu, Xi'an (CN); MeiPing Li, Chengdu (CN); QiPing He, Chengdu (CN); Jun Li, Xi'an (CN); Fan Jiang, Xi'an (CN); ZhiHui Li, Xi'an (CN); Xin Ji, Xi'an (CN); ZhaoHai Meng, Chengdu (CN); ShunXiang Gong, Chengdu (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 18/091,963

(22) Filed: Dec. 30, 2022

(65) Prior Publication Data

US 2023/0147847 A1    May 11, 2023

Related U.S. Application Data

(62) Division of application No. 16/676,360, filed on Nov. 6, 2019, now Pat. No. 11,590,697.

(30) Foreign Application Priority Data

Sep. 6, 2018 (CN) .......................... 201811034389.6
Sep. 5, 2019 (CN) .......................... 201910841136.8

(51) Int. Cl.
| | | |
|---|---|---|
| *B29C 64/165* | (2017.01) | |
| *B23K 26/342* | (2014.01) | |
| *B29C 64/314* | (2017.01) | |
| *B29K 105/16* | (2006.01) | |
| *B29K 509/02* | (2006.01) | |
| *B33Y 10/00* | (2015.01) | |

(Continued)

(52) U.S. Cl.
CPC .......... *B29C 64/165* (2017.08); *B23K 26/342* (2015.10); *B29C 64/314* (2017.08); *B33Y 10/00* (2014.12); *B33Y 40/00* (2014.12); *B33Y 70/00* (2014.12); *B29K 2105/165* (2013.01); *B29K 2509/02* (2013.01)

(58) Field of Classification Search
CPC ..... B29C 64/10; B29C 64/165; B29C 64/314; B33Y 10/00; B33Y 70/00
See application file for complete search history.

(56) References Cited

U.S. PATENT DOCUMENTS

| | | | | |
|---|---|---|---|---|
| 4,671,909 A | * | 6/1987 | Torobin | .................. B01J 35/08 264/43 |
| 2021/0187839 A1 | * | 6/2021 | Tandy | .................. B29C 64/165 |

* cited by examiner

*Primary Examiner* — Michael P Wieczorek

(57) ABSTRACT

A 3D printing method for an impact-resistant gradient complex part containing a hollow ceramic sphere complex, wherein the method includes the following steps: 1) designing the size and shape of the part as well as an internal layered structure; 2) providing a raw material, wherein the raw material contains a high polymer, a curing agent and hollow ceramic spheres; and 3) providing the raw material with a certain thickness according to a design, then, curing the raw material by using a heat source to form a high polymer layer containing the hollow ceramic spheres, and repeatedly printing the high polymer layer according to the (Continued)

design until the high polymer layer reaches the designed thickness to form the impact-resistant gradient complex part.

1 Claim, 4 Drawing Sheets

(51) Int. Cl.
*B33Y 40/00* (2020.01)
*B33Y 70/00* (2020.01)

3D PRINTING METHOD FOR AN IMPACT-RESISTANCE GRADIENT COMPLEX PART

CROSS-REFERENCE TO RELATED APPLICATIONS

This application is a divisional application of U.S. patent application Ser. No. 16/676,360, filed Nov. 6, 2019. This application claims priorities to U.S. patent application Ser. No. 16/676,360, filed Nov. 6, 2019, and to the Chinese patent applications CN 201811034389.6, filed Sep. 6, 2018, and CN 201910841136.8, filed Sep. 5, 2019. The entire disclosure of the above-identified applications are incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present disclosure relates to the technical field of composite preparation and in particular relates to a composite containing hollow ceramic spheres and a preparation method of the composite.

BACKGROUND

Hollow ceramic spheres are novel materials which may be prepared on a large scale and are currently and mainly used as a propping agent for petroleum and natural gas exploitation. The hollow ceramic spheres have the characteristics of low density and high strength and have a huge application potential in the development of novel complexes. If the hollow ceramic spheres are added into an organic dielectric material such as epoxy resin, the heat conductivity coefficient, dielectric properties and mechanical strength of these organic matters may be improved. If the hollow ceramic spheres are added into a metal material, the mechanical properties of the metal material may be effectively improved to prepare a composite which is low in density, high in strength and resistant to impact, and the material serving as a structural material has an important application value in many fields. When being used as protecting materials, the hollow ceramic spheres are combined with other materials to form a gradient layered structure, so that the properties can be further improved. For example, a surface layer is a high-hardness metal material, a middle layer is a complex, and a bottom layer is a high polymer soft material, so that the impact resistance of the material may be greatly improved. 3D printing is a rapid forming technology and is used for constructing an article in a layer-by-layer printing way, and the properties of the material may be precisely designed and controlled by regulating the composition and structural parameters of a layered structure.

Therefore, a heretofore unaddressed need exists in the art to address the aforementioned deficiencies and inadequacies.

SUMMARY

For this purpose, the present disclosure aims at preparing a novel complex material through improving properties of a high polymer and a metal material by using the characteristics of low density and high strength of hollow ceramic spheres and further providing a composite containing hollow ceramic spheres and a preparation method of the composite so as to overcome defects in the prior art.

On one hand, the present disclosure provides a 3D printing method for an impact-resistant gradient complex part containing a hollow ceramic sphere complex, comprising the following steps:
1) designing the size and shape of the part as well as an internal layered structure;
2) providing two raw materials, wherein one of the two raw materials is metal or high polymer powder, and the other raw material is hollow ceramic spheres;
3) providing the metal or high polymer powder with a certain thickness according to a design, then, melting and curing the powder by using a heat source to form a metal layer or a high polymer layer, and repeatedly printing the metal layer or the high polymer layer according to the design until the metal layer or the high polymer layer reaches the designed thickness of the metal layer or the high polymer layer;
4) providing a layer of hollow ceramic spheres on the surface of the metal layer or a high polymer layer, providing the metal powder or the high polymer powder until gaps among all the spheres are filled, then, melting and curing the powder by using the heat source to form a metal or high polymer-ceramic sphere complex layer, and repeatedly printing the complex layer until the complex layer reaches the designed thickness; and
5) repeating steps 3) and 4) to form the impact-resistant gradient complex part.

On the other hand, the present disclosure provides a 3D printing method for an impact-resistant gradient complex part containing a hollow ceramic sphere complex, wherein the method comprises the following steps:
1) designing the size and shape of the part as well as an internal layered structure;
2) providing a raw material, wherein the raw material contains a high polymer, a curing agent and hollow ceramic spheres; and
3) providing the raw material with a certain thickness according to a design, then, curing the raw material by using a heat source to form a high polymer layer containing the hollow ceramic spheres, and repeatedly printing the high polymer layer according to the design until the high polymer layer reaches the designed thickness to form the impact-resistant gradient complex part.

On another hand, the present disclosure provides a preparation method of a hollow ceramic sphere-high polymer complex dielectric material, wherein the preparation method of the material comprises the following steps:
1) providing hollow ceramic spheres and a high polymer material;
2) uniformly mixing the high polymer material with a curing agent and a plasticizer;
3) adding the hollow ceramic spheres, carrying out uniform stirring and mixing, and carrying out vacuum degassing; and
4) heating the mixture obtained in the step 3, and carrying out curing treatment to obtain the hollow ceramic sphere-high polymer complex dielectric material.

The composite has the advantages that the obtained composite has the characteristics of relatively low density and high strength. The impact-resistant gradient complex part is a layered complex, the composition and properties of the complex may be regulated in a direction vertical to a layer according to a design, for example, mechanical properties of the complex are transitioned from soft to hard to form gradient change by regulating the change of the composition, and meanwhile, the thickness among layers with different properties is accurately controlled as required. The dielectric, heat conducting and mechanical properties of the hollow ceramic sphere-high polymer complex dielectric material are greatly improved.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Figure 1:
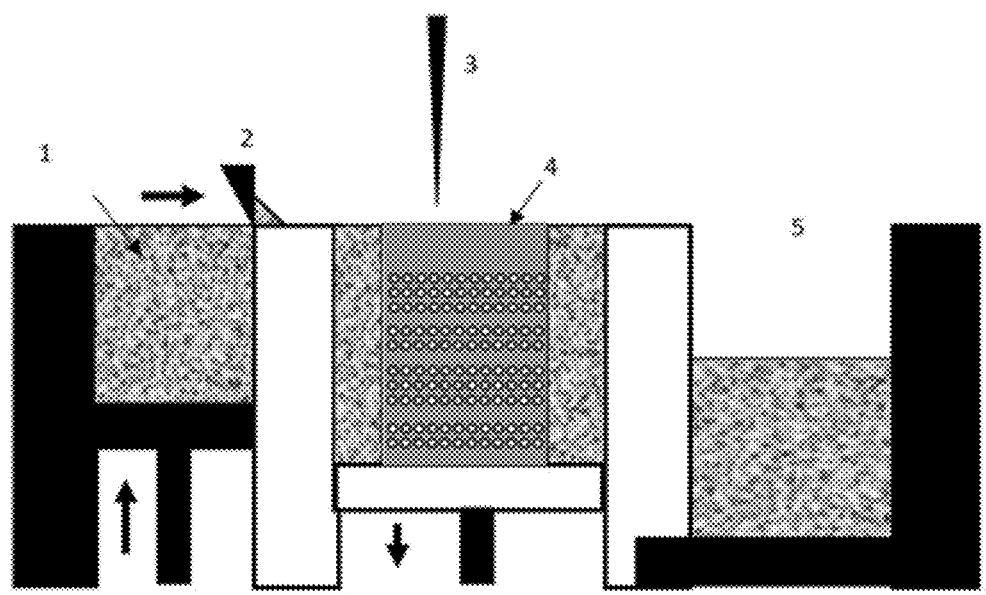
FIG. 1 is a schematic diagram of 3D printing provided by the present disclosure.

Wherein 1—3D printing raw material, 2—scraper, 3—laser, 4—gradient complex, 5—collector, 6—hollow ceramic spheres, 7—matrix, 8—pure matrix, 9—complex, 10—thin-layer pure matrix, 11—thin-layer complex.

DETAILED DESCRIPTION OF THE EMBODIMENTS

The present disclosure is further described below in combination with detailed embodiments in order to make the technical content clearer and convenient to understand. The present disclosure may be embodied by many embodiments in different forms, and the protection scope of the present disclosure is not only limited to the embodiments mentioned herein.

On one hand, the present disclosure provides a 3D printing method for an impact-resistant gradient complex part containing a hollow ceramic sphere complex, comprising the following steps:

1) designing the size and shape of the part as well as an internal layered structure;
2) providing two raw materials, wherein one of the two raw materials is metal powder, and the other raw material is hollow ceramic spheres;
3) providing the metal powder with a certain thickness according to a design, then, melting and curing the powder by using a heat source to form a metal layer, and repeatedly printing the metal layer according to the design until the metal layer reaches the designed thickness of the metal layer;
4) providing a layer of hollow ceramic spheres on the surface of the metal layer, providing the metal powder until gaps among all the spheres are filled, then, melting and curing the powder by using the heat source to form a metal-ceramic sphere complex layer, and repeatedly printing the complex layer until the complex layer reaches the designed thickness; and
5) repeating steps 3) and 4) to form the impact-resistant gradient complex part.

Preferably, the melting temperature in the steps 3) and 4) is selected without special requirements if only the conventional melting temperature of a corresponding material is selected.

Preferably, the metal powder includes, but is not limited to aluminum powder and titanium powder.

On the other hand, the present disclosure provides a 3D printing method for an impact-resistant gradient complex part containing a hollow ceramic sphere complex, wherein the method comprises the following steps:

1) designing the size and shape of the part as well as an internal layered structure;
2) providing a raw material, wherein the raw material contains a high polymer, a curing agent and hollow ceramic spheres; and
3) providing the raw material with a certain thickness according to a design, then, curing the raw material by using a heat source to form a high polymer layer containing the hollow ceramic spheres, and repeatedly printing the high polymer layer according to the design until the high polymer layer reaches the designed thickness to form the impact-resistant gradient complex part.

Preferably, the high polymer powder comprises a mixture of epoxy resin and a coupling agent, epoxy resin, Nylon, polyetheretherketone (PEEK), polyphenylene sulfide (PPS) and polyimide (PI).

Preferably, in the mixture of the epoxy resin and the coupling agent, the coupling agent may select a common coupling agent in the field, such as polybasic carboxylic acid and cyclic anhydride.

Preferably, the diameters of the hollow ceramic spheres range from 50 μm to 5 mm, and the ratio of wall thicknesses to radiuses of the hollow ceramic spheres is 1/3 to 2/3.

Preferably, the breakage rate of the hollow ceramic spheres is smaller than 5 under 35 MPa, is smaller than 5 under 60 MPa and is smaller than 5 when the pressure is higher than 86 MPa.

Preferably, a material of the hollow ceramic spheres includes, but is not limited to glass, $SiO_2$, corundum ($Al2O3$), mullite and a mixture of the corundum and the glass.

On another hand, the present disclosure provides an impact-resistant gradient complex part containing a hollow ceramic sphere complex, which is prepared by using the above 3D printing method.

On further hand, the present disclosure provides a preparation method of a hollow ceramic sphere-high polymer complex dielectric material, wherein the preparation method of the material comprises the following steps:

1) providing hollow ceramic spheres and a high polymer material;
2) uniformly mixing the high polymer material with a curing agent and a plasticizer;
3) adding the hollow ceramic spheres, carrying out uniform stirring and mixing, and carrying out vacuum degassing; and
4) heating the mixture obtained in the step 3, and carrying out curing treatment to obtain the hollow ceramic sphere-high polymer complex dielectric material.

Preferably, both the curing agent and the plasticizer are a conventional curing agent and a conventional plasticizer in the field.

Preferably, heating curing is not specially required if only the curing condition of a corresponding high polymer material is met.

Preferably, the diameters of the hollow ceramic spheres range from 50 μm to 5 mm, and the ratio of wall thicknesses to radiuses of the hollow ceramic spheres is 1/3 to 2/3.

Preferably, a material of the hollow ceramic spheres includes, but is not limited to glass, SiO2, corundum (Al2O3), mullite and a mixture of the corundum and the glass; and the high polymer comprises epoxy resin, Nylon, polyetheretherketone (PEEK), polyphenylene sulfide (PPS), polyimide (PI) and a mixture thereof.

On yet further hand, the present disclosure provides a hollow ceramic sphere-high polymer complex dielectric material which is prepared by using the above method.

Embodiment 1: Hollow Ceramic Sphere-Epoxy Resin Gradient Complex

Bisphenol-A epoxy resin (DGEBA), polycaprolactone diol and a triarylsulfonium hexafluoroantimonate cationic photoinitiator are mixed according to a certain proportion to prepare a liquid A; and a certain proportion of hollow ceramic spheres are added into the liquid A to prepare B.

As shown in FIG. 1, B with a certain thickness is provided, epoxy resin is cured by carrying out ultraviolet irradiation for a certain time to form a complex thin layer, the above step is repeated until the thickness of a complex layer reaches the designed thickness, then, A with a certain thickness is provided, the epoxy resin is cured by carrying out ultraviolet irradiation for a certain time to form a pure epoxy resin thin layer, and the pure epoxy resin layer is repeatedly printed until the pure epoxy resin layer reaches the designed thickness. The complex layer and the pure epoxy resin layer are repeatedly printed until a designed gradient complex product is formed, and the product is heated in vacuum at 150 DEG C. to further make the epoxy resin cured and remove the stress in the product.

Embodiment 2: Hollow Ceramic Sphere-Titanium Gradient Complex

As shown in FIG. 1, hollow ceramic spheres (at least one single layer) with a certain thickness are provided, thin-layer titanium powder is provided on the ceramic spheres, gaps among the ceramic spheres are completely filled with the titanium powder by vibration or other mechanisms, then, the titanium powder is coagulated by carrying out laser irradiation for a certain time to connect the hollow spheres into a whole so as to form a hollow ceramic sphere-titanium complex thin layer, the above step is repeated until the thickness of the complex layer reaches the designed thickness, then, the titanium powder with a certain thickness is provided, the titanium powder is coagulated by carrying out laser irradiation for a certain time to form a pure titanium thin layer, the pure titanium layer is repeatedly printed until the pure titanium layer reaches the designed thickness. The complex layer and the pure titanium layer are repeatedly printed until a designed gradient complex product is formed, and the product is subjected to high-temperature treatment in vacuum to be further coagulated and cured and remove the stress in the product.

Embodiment 3: Hollow Ceramic Sphere-Epoxy Resin Complex

Bisphenol-A epoxy resin (DGEBA), methyl tetrahydrophthalic anhydride (MTHPA) serving as a curing agent and N,N-dimethylbenzylamine (BDMA) serving as an accelerator are mixed according to a proportion of 100:86:2, hollow ceramic spheres (the roundness is larger than 0.95, the apparent density is 2.7, and the breakage rate under the pressure of 86 MPa is smaller than 5%) with the weight percentage being 65% are added, uniform stirring is performed, and then, the mixture is degassed in vacuum at 60 DEG C. for 30 min, is then cured at 100 DEG C. for 2 h and is cured at 150 DEG C. for 10 h to obtain a hollow ceramic sphere-epoxy resin complex.

Figure 4:
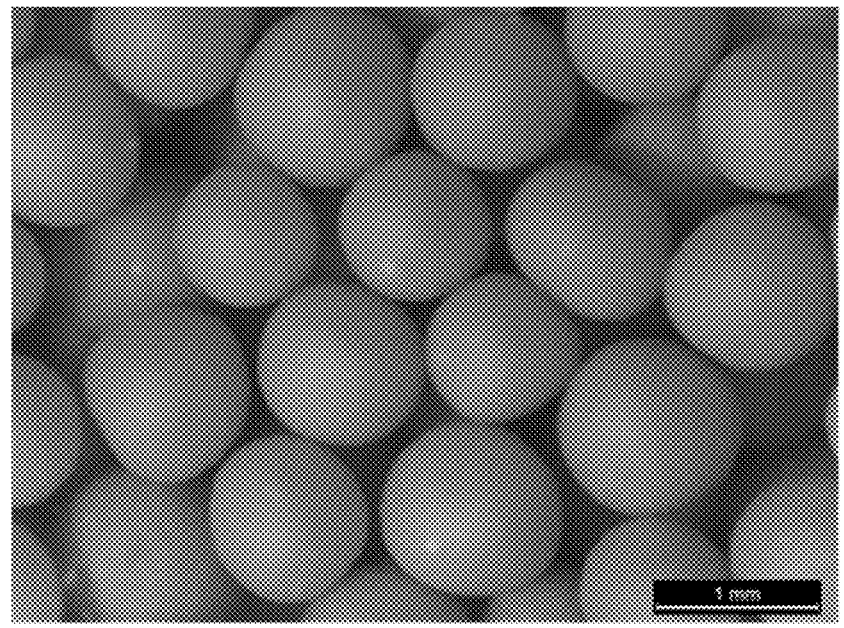
FIG. 4 an optical microscope diagram of an epoxy resin-hollow sphere complex prepared by the present disclosure.
Figure 5:
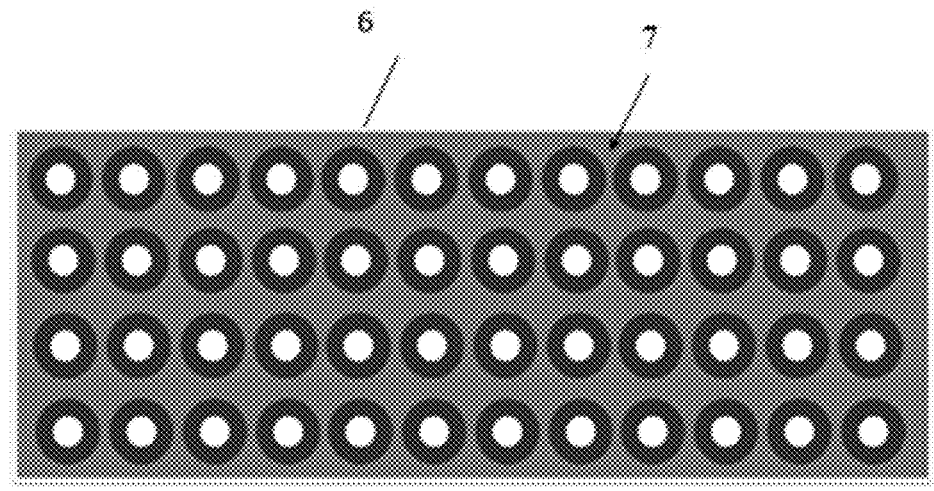
FIG. 5 is a uniform hollow ceramic sphere-sphere complex used in the present disclosure.

Under an optical microscope, as shown in FIG. 4, the hollow ceramic spheres are approximately closely accumulated, gaps among the closely accumulated hollow ceramic spheres are filled with epoxy resin, and the hollow ceramic spheres are tightly connected to form a complex. FIG. 5 displays uniform distribution of the hollow ceramic spheres in a matrix.

As shown in table 1, the dielectric, heat conducting and mechanical properties of the complex are greatly improved as comparison with those of the pure epoxy resin prepared under the same condition.

TABLE 1

Dielectric, Heat Conducting and Mechanical Properties of Complex.

| Properties | Dielectric constant | Heat conductivity (W/(m · k)) | Compressive strength (MPa) | Impact strength (KJ/m$^2$) |
|---|---|---|---|---|
| Pure epoxy resin | 4.3 | 0.16 | 88.0 | 2.7 |
| Complex | 9.7 | 1.4 | 124.2 | 3.4 |

Figure 2:
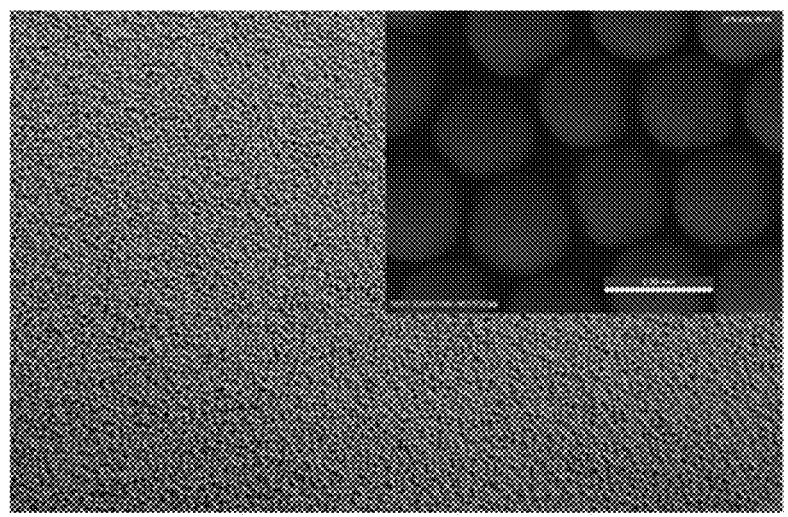
FIG. 2 is high-strength hollow ceramic spheres used in the present disclosure.

FIG. 2 is high-strength hollow ceramic spheres used in the present disclosure.

Figure 3:
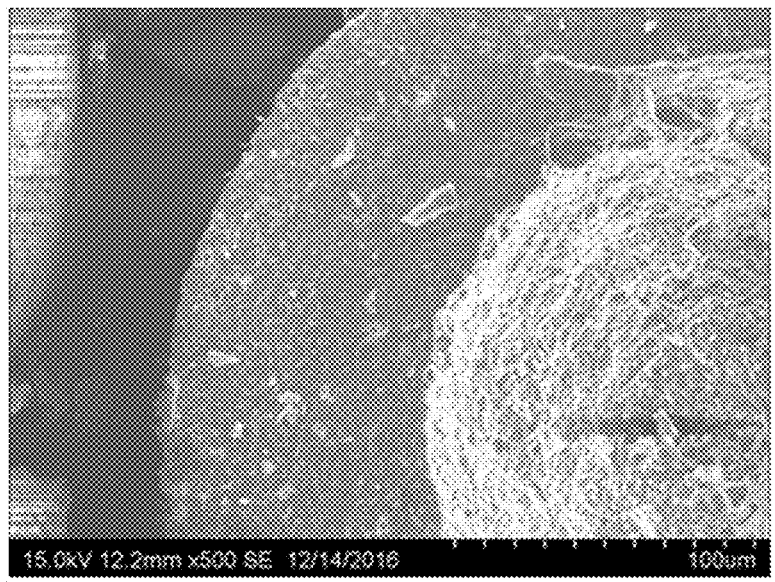
FIG. 3 an electron microscope diagram of cross sections of the hollow ceramic spheres used in the present disclosure.

FIG. 3 an electron microscope diagram of cross sections of the hollow ceramic spheres used in the present disclosure.

Figure 6:
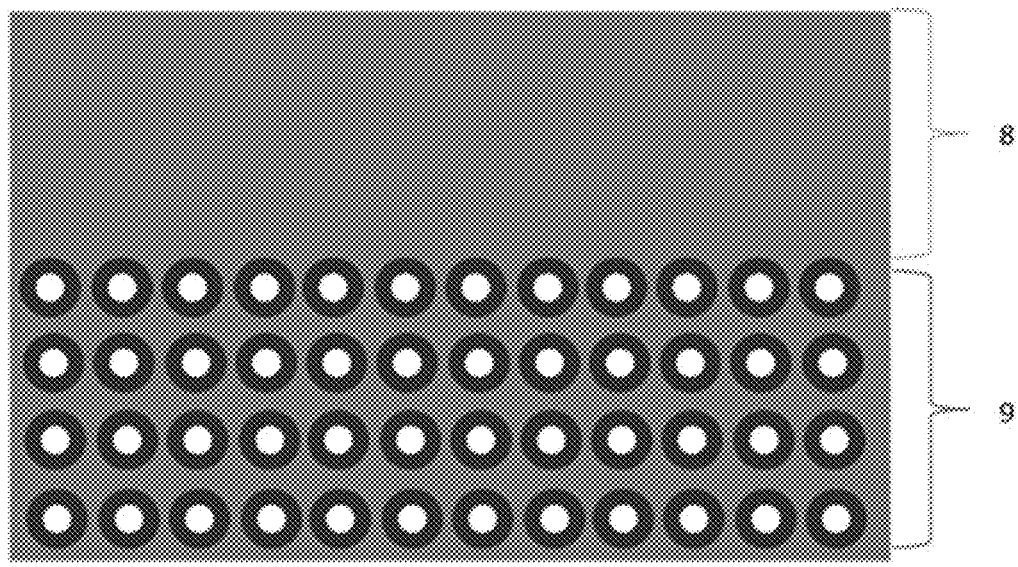
FIG. 6 is a schematic diagram of a gradient complex part prepared by the present disclosure.

FIG. 6 is a schematic diagram of a gradient complex part prepared by the present disclosure.

Figure 7:
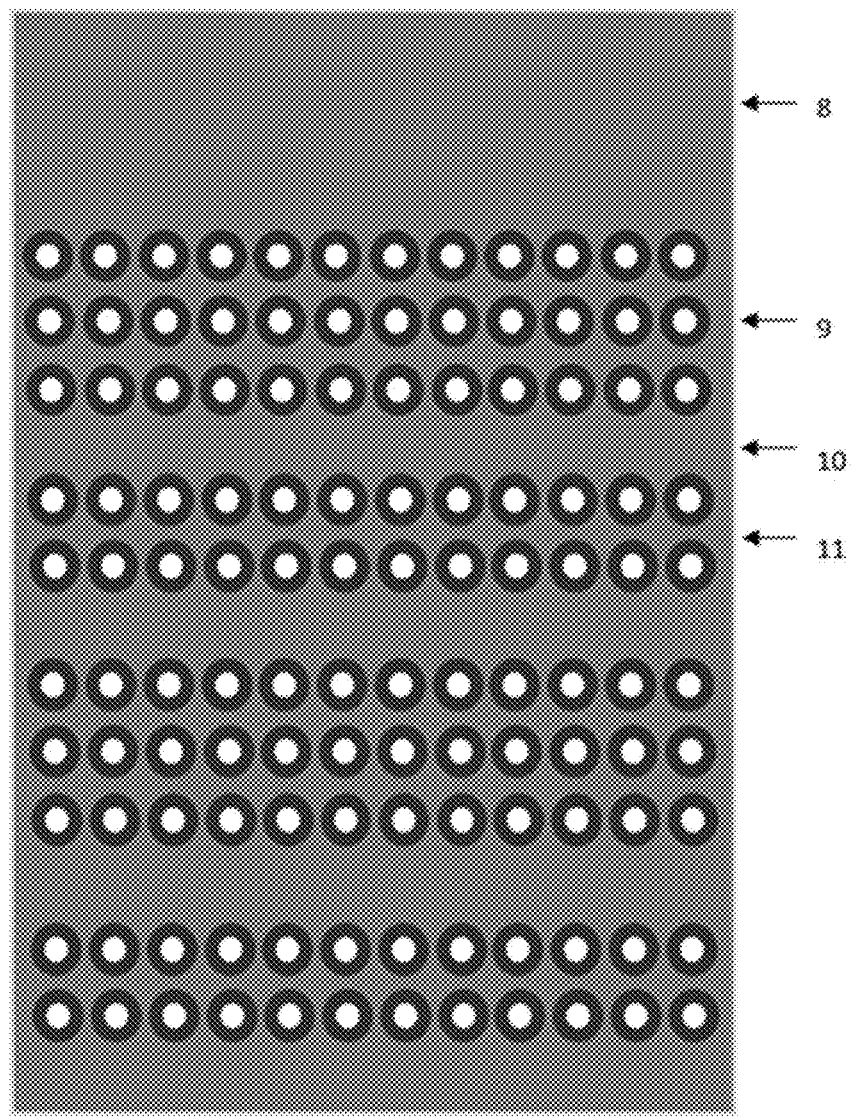
FIG. 7 is a schematic diagram of the other example of the gradient complex part prepared by the present disclosure.

FIG. 7 is a schematic diagram of the other example of the gradient complex part prepared by the present disclosure.

Based on the above, the embodiments are only preferred embodiments of the present disclosure, rather than to limit the present disclosure, each embodiment is described in a progressive way, same or similar parts in all the embodiments refer to one another, and the part highlighted in each embodiment is different from other embodiments. Any minor modification, equivalent replacements and improvement for the embodiments according to the technical essence of the present disclosure should fall into the protection scope of the technical solution of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A 3D printing method for an impact-resistant gradient complex part containing a hollow ceramic sphere complex, wherein the method comprises the following steps:
   1) Designing the size and shape of the part as well as an internal layered structure;
   2) providing two raw materials and a curing agent, wherein the first raw material of the two raw materials contains a high polymer powder, and the second raw material of the two raw materials is hollow ceramic spheres, wherein the high polymer powder comprises all of (a) a mixture of epoxy resin and a coupling agent, (b) epoxy resin, (c) Nylon, (d) polyetheretherketone (PEEK), (e) polyphenylene sulfide (PPS) and (f) polyimide (PI), wherein
      in the mixture of the epoxy resin and the coupling agent, the coupling agent selects one of polybasic carboxylic acid and cyclic anhydride;
      the diameters of the hollow ceramic spheres range from 50 μm to 5 mm and a ratio of wall thicknesses to radiuses of the hollow ceramic spheres is 1/3 to 2/3; and
      the breakage rate of the hollow ceramic spheres is smaller than 5% when the pressure is higher than 86 MPa; and
   3) providing the first raw material with a first certain thickness according to a design, curing the raw material by using a heat source to form a high polymer layer containing the hollow ceramic spheres, and repeatedly printing the high polymer layer according to the design until the high polymer layer reaches the designed thickness to form the impact-resistant gradient complex part, wherein
      a material of each of the hollow ceramic spheres includes all of $SiO_2$, corundum ($Al_2O_3$), mullite and a mixture of the corundum and a glass;
      the impact-resistant gradient complex part is a layered complex, composition and properties of the impact-resistant gradient complex are configured to be regulated in a direction vertical to a layer according to the design; a thickness among layers with different properties of the impact-resistant gradient complex is controlled; dielectric, heat conducting and mechanical properties of a hollow ceramic sphere-high polymer complex dielectric material are improved.

* * * * *